No. 775,579. PATENTED NOV. 22, 1904.
G. R. RICH.
EXPANDING LATHE MANDREL.
APPLICATION FILED FEB. 25, 1904.
NO MODEL.

Witnesses:

Inventor,
George R. Rich,
By Offield Towle & Linthicum,
Attys.

No. 775,579. Patented November 22, 1904.

UNITED STATES PATENT OFFICE.

GEORGE R. RICH, OF CHICAGO, ILLINOIS, ASSIGNOR TO THE GEORGE R. RICH MANUFACTURING COMPANY, OF CHICAGO, ILLINOIS, A CORPORATION OF ILLINOIS.

EXPANDING LATHE-MANDREL.

SPECIFICATION forming part of Letters Patent No. 775,579, dated November 22, 1904.

Application filed February 25, 1904. Serial No. 195,252. (No model.)

*To all whom it may concern:*

Be it known that I, GEORGE R. RICH, a citizen of the United States, residing at Chicago, in the county of Cook and State of Illinois, have invented certain new and useful Improvements in Expanding Lathe-Mandrels, of which the following is a specification.

My invention relates to improvements in expanding lathe-mandrels, such as are employed for cutting gears, milling operations, turning up pulleys, and the like, wherein a mandrel driven into the central bore of the object to be turned is supported upon and rotated by the end centers of the lathe.

Various devices have heretofore been employed to enable a single mandrel to serve articles having axial bores of somewhat varying diameters; but such expansible mandrels as I am acquainted with are quite expensive to construct, quite complicated as to their mechanism, and do not always hold the material accurately and without slip.

The object of my invention is to produce an expansible lathe-mandrel of increased simplicity and economy of manufacture, combined with increased efficiency and reliability for its intended purpose.

To this end my invention consists in the combination, with a longitudinally-tapered mandrel-bar, of an expansible coil internally tapered to correspond with the taper of the mandrel-bar and adapted to be radially expanded by having the latter driven through it.

My invention in its preferred form is illustrated in the accompanying drawings, wherein—

Figure 1:
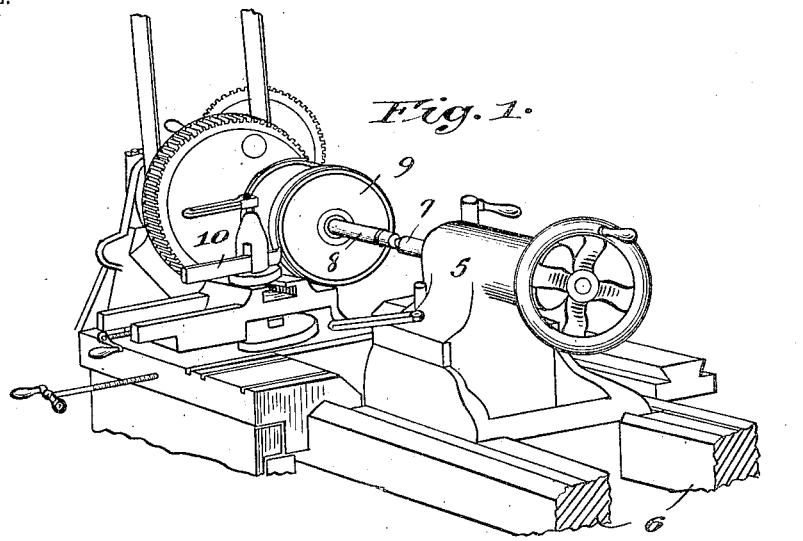
Figure 2:
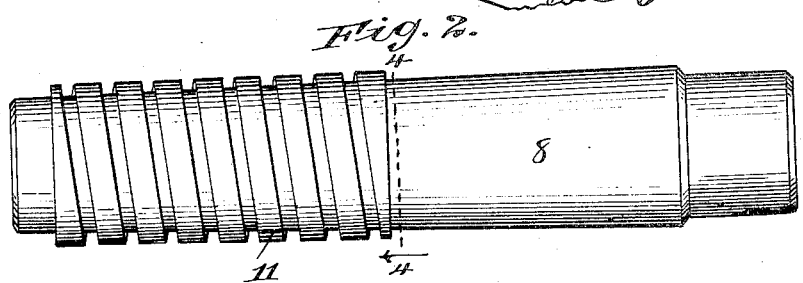
Figure 3:
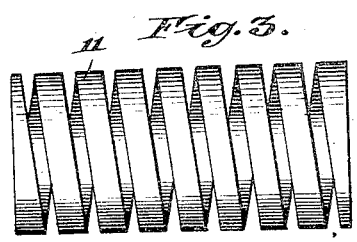
Figure 4:
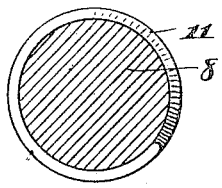

Figure 1 is a perspective view of a lathe employing my improved mandrel. Fig. 2 is a detail view of the mandrel detached. Fig. 3 is a similar detail view of the expansible spiral which coöperates with the tapered mandrel-bar, and Fig. 4 is a cross-sectional view on the line 4 4 of Fig. 2 looking in the direction of the arrow.

In Fig. 1 of the drawings I have illustrated a conventional form of lathe with which my improved mandrel may be employed, it being understood that my invention is not concerned with any particular form of lathe, but may be applied to any lathe having end centers adapted to receive and hold the ends of my improved mandrel. In Fig. 1, therefore, 5 may designate the adjustable head of the lathe, mounted on parallel supports 6 and rotatably supporting the end centering device or chuck 7, which engages and centers the mandrel-bar 8, on which is mounted the work to be turned, such as the pulley 9, the periphery of which is planed by the suitably-supported planing-tool 10, all as is usual and well known in this class of lathes.

My invention has to do with the construction of the expansible mandrel supported and centered between the chuck 7 and a corresponding chuck on the other end of the lathe. As shown in Fig. 2, this mandrel consists of a mandrel-bar 8, circular in cross-section and having a gradual taper from end to end or throughout so much of its length as may be required to engage the axial bore of the work carried thereby.

11 designates a coil in the form of a cylindrical spiral, which is made of elastic material, preferably some spring metal, such as steel, which coil is of uniform diameter throughout externally, but internally has a tapered bore corresponding as to its degree of inclination from its axial line to the taper of the mandrel-bar 8. This coil is preferably flat on both its inner and outer surfaces in the direction of its length, so as to afford a maximum friction holding effect upon the parts engaged thereby.

In practice the coil 11 is first laid within the axial bore of the object to be cut or turned up. The smaller end of the mandrel-bar is next inserted into the larger end of the spiral and through the latter, being driven into the same until it expands the spiral into hard frictional engagement with the bore of the work, this operation at the same time of course producing an equally secure frictional engagement between the mandrel-bar and the coil. The article to be operated upon is then inserted and clamped between the end centers or chucks of the lathe and the machine started in operation. When the work has been finished, a hard blow on the smaller end of the mandrel is sufficient to drive it out of the spiral, after which the contraction of the latter due to its elasticity causes it to drop out of the bore of the article operated upon.

I claim—

1. An expansible mandrel comprising a tapered mandrel-bar, in combination with a correspondingly internally-tapered spiral adapted to engage and be expanded against the axial bore of the article operated upon, substantially as described.

2. An expansible mandrel comprising a tapered mandrel-bar, in combination with a spring-metal spiral of uniform external diameter and internally tapered corresponding to the taper of the mandrel-bar, substantially as described.

3. An expansible mandrel comprising a tapered mandrel-bar, in combination with a spring-metal spiral whose inner and outer surfaces are flat in the direction of the length of the spiral, said spiral being of uniform external diameter and internally tapered corresponding to the taper of the mandrel-bar, substantially as described.

GEORGE R. RICH.

Witnesses:
FREDERICK C. GOODWIN,
ALBERT H. GRAVES.